Sept. 21, 1965 N. A. SANCHIRICO ETAL 3,206,864
SYSTEM FOR RAPIDLY DETERMINING TRUE NORTH AT ANY
LATITUDE ON THE EARTH'S SURFACE
Filed Jan. 5, 1962
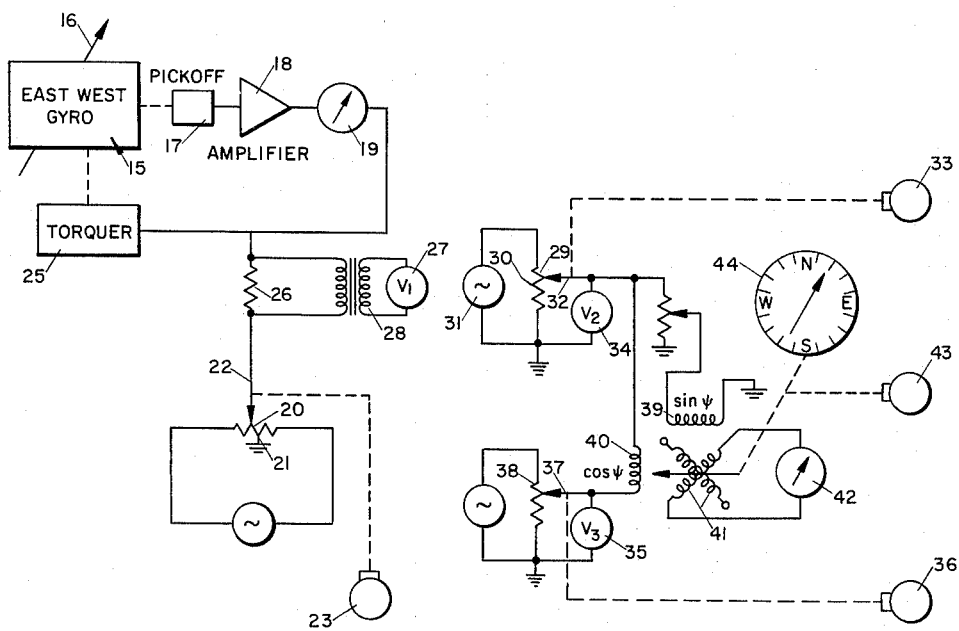
NEIL A. SANCHIRICO
JOHN P. SPUTZ
HOWARD M. POLLACK
*INVENTORS*
BY *S. A. Giarratana*
*ATTORNEYS*

United States Patent Office 3,206,864
Patented Sept. 21, 1965

3,206,864
SYSTEM FOR RAPIDLY DETERMINING TRUE NORTH AT ANY LATITUDE ON THE EARTH'S SURFACE
Neil A. Sanchirico, Bronx, N.Y., and John P. Sputz and Howard M. Pollack, Oakland, N.J., assignors to General Precision Inc., Little Falls, N.J., a corporation of Delaware
Filed Jan. 5, 1962, Ser. No. 164,535
2 Claims. (Cl. 33—226)

This invention generally relates to improvements in the system for rapidly determining true north at any latitude on the earth's surface, and more particularly to such systems employing the earth's rotation about its axis and the effect of such rotation upon a stable element, such as a gyroscope controlled platform.

It is, accordingly, a principal object of the invention to provide such an apparatus for determining true north-south direction both rapidly and accurately.

It is, acordingly, an object of the invention to provide an improved system for determining true north by measuring the earth's rotation about a selected horizontal axis whose orientation with respect to true north is not known.

A further object is to provide such a system wherein the measurements are made along two axes that are displaced from one another by a known amount.

A still further object is to provide a system requiring a minimum of apparatus and a minimum complexity.

Another object is to provide an improved system of this type making use of only one gyroscope controlled platform as the stable element.

Still another object is to provide such a system that is not subject to error in confusing north with south or east with west or oppositely disposed angles in between.

To the fulfillment of these objects, the present invention contemplates a gyrocompassing system which includes a gyroscope having an output axis pickoff and an electrical torquer in a closed-loop servo arrangement operating the gyroscope in a rate-captured mode whereby torquer current is proportional to the input rate. Means are provided for orienting the gyroscope with its spin axis in a local horizontal plane and aligned in an approximate east-wing heading, such means also enabling reorientation of the gyroscopes in azimuth to a second position in which the spin axis makes a known, small angle with the original heading. Means are also provided for making respective electrical analog measurements of the torquer current at the original and reoriented positions of the gyroscope and for deriving the difference in magnitude between such measurements. An angular resolver computes the unknown angle between the spin axis and true east-west heading at the original gyroscope position, from the torquing current measurements.

Other objects and many additional advantages will be more readily understood by those skilled in the art after a detailed consideration of the following specification taken with the accompanying drawing wherein The single figure of drawing is an electrical schematic illustrating one preferred measuring and computing system according to the invention.

It is well-known in the art that a simple gyroscope having its spin axis precisely parallel to the axis of the earth's rotation shows no output (precession) due to earth's rate ($\omega$) because the parallelism of the spin and earth's rotation axes is not disturbed by the turning of the earth. Any output observed under these conditions is, of course, due to inherent imperfections in the gyroscope. On the other hand, if the spin axis is at an angle to the true north heading, precession occurs at a rate proportional to the angle between the spin axis and true north. The gyroscope output rate is a sine function of this angle and, therefore, reaches a maximum when the spin axis is at 90° to true north, i.e., aligned in an east-west heading. Moreover, where the spin axis is disposed in the plane of the local horizontal rather than parallel to the earth's polar axis, the output rate is also a cosine function of the latitude angle, $\lambda$.

According to one preferred system for practicing the invention, there is provided a gyroscope, whose spin axis is initially oriented in a local horizontal plane and directed at an approximate east-west heading. This approximate heading may be initially determined from the position of the sun or any other available means, such as a simple compass or the like.

In the second step, precession rate is measured and noted. As will be recalled, this measurement yields a quantity that is proportional to the product of the earth's rate, the cosine of the angle of latitude, and the sine of the angle $\psi$ between the gyro spin axis and true north, i.e., $\omega \cos \lambda \sin \psi$. All of the quantities in the above expression are constant or known excepting for the sine of the angle $\psi$.

According to the present invention, a second measurement is taken with the spin axis along a different heading displaced from the first heading by a known small angle of say (5°) five degrees. Thus the gyroscope is rotated so that its spin axis heading is then five degrees displaced from its initial heading after which the precession rate is again measured and noted.

Thus the first measurement is proportional to $$\omega \cos \lambda \sin \psi \quad (1)$$

and the second measurement is proportional to $$\omega \cos \lambda \sin (\psi+5°) \quad (2)$$

as the earth rate is, of course, constant and $\cos \lambda$ is also a constant for the particular readings, the unknown angle $\psi$ can be computed by means of the system shown in the drawings and hereinafter described, which system is preferred for practicing the invention as it employs a minimum number of components and may be easily operated without extensive experience or special skill by the operator.

A conventional, single-axis, gyro, indicated generally at 15, is first placed in a vertical plane, established by gravity leveling of its base by such means as employing a spirit level and two hand cranks operating suitable gearing (leveling means not shown). The gyro spin axis is then oriented in an approximate east-west direction. As will appear as this description proceeds, gyro 15 is operated in a rate-captured mode by means of a conventional closed-loop servo system including an output axis pickoff 17 and torquer 25.

After the gyro wheel is brought up to speed, the circuit is energized and a signal is produced by the gyro pickoff 17, which signal is proportional to the tendency of the gyro to precess due to earth's rate. This signal is passed through a suitable amplifier 18 and compared with a potential obtained from an energized potentiometer 20, whose center tap 21 is grounded to enable reversed polarity voltages to be obtained. The movable tap 22 of potentiometer 20 is adjusted by means of the operator's manipulation of knob 23 until the potential being produced thereby is equal to the amplified gyro signal; at which time the meter 19 indicates a null or balance condition. This signal from potentiometer 20 is also directed in feedback to energize the gyro torque generating means 25 which exerts a torque equal and opposite to the output or precession rate of the gyro. The current flow to torquer 25 is, therefore, proportional to the input rate to the gyro. A signal voltage proportional to torquer current flow is produced across a resistor 26 and this signal is indicated at meter 27 connected across resistor 26 through a suitable transformer 28, if needed. Thus the signal indicated at meter 27 is directly proportional to the sine function of the initial angle $\psi$ of misalignment between the gyro spin axis and a true north-south heading.

For storing this signal on meter 27, there is provided a second energized potentiometer 29 whose movable tap or slider 32 is adjustable by means of hand knob 33. Knob 33 is thus adjusted by the operator until the voltage indicated by meter 34 is the same as that indicated by meter 27.

To obtain the second measurement, the spin axis of gyro 15 is then displaced by a small known angle of say five degrees (5°) and the hand knob 23 is manually turned by the operator until meter 19 is again reading at null. This supplies a different electrical signal from potentiometer 20 to the gyro torque generating means that is just sufficient to precess the gyro in its new heading to compensate for the earth's rotation. When the system is again at balance, as indicated by the null reading of meter 19, the reading at meter 27 is again noted. In this case the meter reading at 27 is proportional to the sine function of the sum of $\psi$, the original unknown angle, and the fixed angle between the first and second headings of the gyro spin axis, viz., $$\sin(\psi+5°)$$

The reading of meter 27 is then transferred and stored at meter 35 by the operator adjusting the hand knob 36 which, in turn, positions the slider or tap 37 of energized potentiometer 38 until the reading of meter 35 is the same as that of meter 27.

Thus the voltage across meter 34 is proportional to the sine function of the unknown angle or:

$$\sin \psi$$

and the voltage across meter 35 is proportional to the sine function of this unknown angle plus a known increment or:

$$\sin(\psi+5°)$$

However, it can be shown by trigonometric identity that this latter function is equal to:

$$\sin \psi + 0.1 \cos \psi$$

since the cosine of 5° is substantially equal to one and the sine of 5° is substantially equal to 0.1.

To resolve the trigonometric quantities without ambiguity as to quadrant, the voltage at meter 34 (proportional to $\sin \psi$) is then directed to energize one of the stator windings 39 of an angular resolver, and the difference between the voltages at meters 34 and 35 is directed to energize the other stator winding 40 of the angular resolver. This difference in voltage is proportional to the cosine of the unknown angle as may be noted by subtracting the voltage at meter 35 from that at meter 34 as follows:

$$(\sin \psi) - (\sin \psi + \sin 5° \cos \psi)$$
$$\approx 0.1 \cos \psi$$

In the final step, the rotor winding 41 of the angular resolver is rotated by means of the operator turning hand knob 43 until the meter 42, connected across rotor 41 indicates a null, at which time the indicator 44, being directly coupled to the rotor 41, indicates the unknown angle $\psi$ which has been determined by the resolver. Thus, according to one preferred embodiment of the invention a relatively simple resolver circuit may be employed in connection with a gyro to determine the exact north-south heading by means of two measurements taken by the gyro 15 or other stable element.

It is believed evident that further simplification in the preferred circuitry may be made to reduce the number of components. For example, instead of employing separate meters, such as 19, 27, 34 and 35, it is contemplated that only one meter need be employed, together with a multiple switch means for interconnecting this sole meter to different junctions in the circuits, as required.

It is considered further evident that the circuit may also be refined to eliminate the need for manual positioning of the hand knobs 23, 33, 36, and 43. In the latter change, known follow-up type systems may be employed to adjust the sliders 32 and 37 of potentiomers 29 and 38 automatically in accordance with the potential at meter 27 and automatically turn the rotor 41 of the angular resolver to null, as desired. Since these and many other variations may be made by those skilled in the art, this invention should be considered as limited only by the following claims.

What is claimed is:

1. A gyrocompass system comprising:
a gyroscope;
means for orienting said gyroscope with its spin axis in a local horizontal plane and aligned to an approximate east-west heading;
pickoff means to detect precession of said gyroscope;
means responsive to said pickoff means to torque said gyroscope about its output axis at a rate sufficient to maintain said gyroscope against precession;
means for displacing said gyroscope so as to realign its spin axis to a second heading making a known, small angle with the initial heading;
means for making respective electrical analog measurements of the torquing rate of said torquing means at said initial heading and at said second heading;
means for obtaining the difference between said analog measurements; and,
means for resolving said measurements and the difference therebetween to determine the angle between said initial heading and true north.

2. A gyrocompass system comprising:
a gyroscope including an output axis pickoff and electrical torquer arranged in a closed-loop servo system with the torquer operating to counteract and preclude precession of the gyroscope, the torquer current being directly proportional to the input rate;
means for orienting said gyroscope with its spin axis in a local horizontal plane and aligned to an approximate east-west heading deviating from true east-west by an unknown angle;
means for displacing said gyroscope in azimuth to realign its spin axis to a second heading making a known, small angle with the initial heading;
means to measure respective voltages proportional to the torquer current at said initial and second headings;
a sine-cosine angular resolver having a pair of stator input windings and a rotor having an output winding;
means for deriving and applying to one of said stator input windings the difference between said respective voltages and for applying to the other of said stator input windings the one of said voltages corresponding to the initial heading; and,
angular adjustment means for said rotor calibrated to indicate said unknown angle when said rotor is turned to a position of minimum output.

References Cited by the Examiner

UNITED STATES PATENTS 2,902,772   9/59   Ciscel _____ 33—226
2,976,618   3/61   Campbell et al. _____ 33—226

ROBERT B. HULL, *Primary Examiner.*